United States Patent
Cheng et al.

(10) Patent No.: US 8,457,257 B2
(45) Date of Patent: Jun. 4, 2013

(54) FREQUENCY DOMAIN ROOT CAZAC SEQUENCE GENERATOR

(75) Inventors: Fang-Chen Cheng, Randolph, NJ (US); Lei Song, Randolph, NJ (US)

(73) Assignee: Alcatel Lucent, Paris (FR)

( * ) Notice: Subject to any disclaimer, the term of this patent is extended or adjusted under 35 U.S.C. 154(b) by 826 days.

(21) Appl. No.: 12/119,902

(22) Filed: May 13, 2008

(65) Prior Publication Data

US 2009/0285337 A1 Nov. 19, 2009

(51) Int. Cl.
*H03D 1/00* (2006.01)
(52) U.S. Cl.
USPC .......................................... 375/343; 375/350
(58) Field of Classification Search
USPC .................. 370/206, 329, 341; 375/144, 343, 375/350; 455/436, 466; 708/426
See application file for complete search history.

(56) References Cited

U.S. PATENT DOCUMENTS

| | | | | |
|---|---|---|---|---|
| 2004/0184421 | A1* | 9/2004 | Hondo | 370/329 |
| 2007/0253465 | A1* | 11/2007 | Muharemovic et al. | 375/130 |
| 2008/0062332 | A1* | 3/2008 | Filliman et al. | 348/730 |
| 2008/0101507 | A1* | 5/2008 | Oketani et al. | 375/343 |
| 2008/0233960 | A1* | 9/2008 | Kangude et al. | 455/436 |
| 2008/0235314 | A1* | 9/2008 | Lee et al. | 708/426 |
| 2008/0310561 | A1* | 12/2008 | Song et al. | 375/343 |
| 2009/0238137 | A1* | 9/2009 | Kishiyama et al. | 370/330 |
| 2010/0046663 | A1* | 2/2010 | Han et al. | 375/295 |
| 2010/0103891 | A1* | 4/2010 | Okubo et al. | 370/329 |

* cited by examiner

*Primary Examiner* — Leon-Viet Nguyen
(74) *Attorney, Agent, or Firm* — Williams, Morgan & Amerson

(57) ABSTRACT

The present invention provides a method for implementation in a random access channel receiver. One embodiment of the method includes generating at least one frequency domain reference sequence by multiplying a generator function and a first frequency domain root CAZAC sequence. The frequency domain reference sequence(s) is generated in response to receiving a signal at the random access channel receiver. This embodiment of the method also includes correlating the received signal and the frequency domain reference sequence(s).

15 Claims, 3 Drawing Sheets

FREQUENCY DOMAIN ROOT CAZAC SEQUENCE GENERATOR

BACKGROUND OF THE INVENTION

1. Field of the Invention

This invention relates generally to communication systems, and, more particularly, to wireless communication sequences.

2. Description of the Related Art

Wireless communication systems typically include one or more base stations or access points for providing wireless connectivity to mobile units in a geographic area (or cell) associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, signaling channels, control channels, and the like. The uplink and downlink channels may be shared or dedicated.

Mobile units can initiate communication with the base station by transmitting a message on one or more of the random access channels (RACHs). Uplink random access messages are non-synchronized and therefore may be transmitted at any time relative to the synchronized downlink timing by any mobile unit within the coverage area of the base station. The receiver in the base station must therefore continuously monitor the random access channels and search the signals received on the random access channels for predetermined sequences of symbols (sometimes referred to as the RACH preamble) in random access messages transmitted by mobile units. To make the search process feasible, the format of the random access messages must be standardized. For example, conventional random access messages in the Universal Mobile Telecommunication Services (UMTS) Long Term Evolution (LTE) system are transmitted in a subframe during a transmission time interval (TTI) of 1 ms in 1.08 MHz bandwidth. The random access messages subframe is divided into a 0.8 ms preamble and a 102.6 μs cyclic prefix that includes a copy of a portion of the sequence of symbols in the preamble. The remaining 97.4 μs in the transmission time interval is reserved as a guard time to reduce or prevent inter-symbol interference between different random access messages or shared data channels.

The sequence of symbols in the preamble may be formed from a basic Constant Amplitude Zero Auto Correlation (CAZAC) sequence. For example, according to TS 36.211, random access preambles $x_{u,v}(k)$ are formed from a CAZAC sequence generated by cyclic shifting of the u-th root Zadoff-Chu (ZC) sequence $x_u(k)$ of length $N_{ZC}$ ($N_{ZC}$=839) by a multiples v of $N_{CS}$, i.e., $$x_{u,v}(k) = x_u((k+vN_{CS}) \bmod N), \quad (1)$$

where $x_u(k)$ is defined by $$x_u(n) = e^{-j\pi u n(n+1)/N_{CZ}}, \quad n = 0 \sim N_{cz}-1,$$

The values of $N_{CS}$ for different configurations are given in the following table based on the agreement from Table 5.7.2-2 of TS36.211v8.2.0:

| Ncs Configuration | Ncs Value | |
| --- | --- | --- |
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

FIG. 1 conceptually illustrates a conventional method of generating orthogonal sequences from an initial (or root) sequence. In FIG. 1, a set of orthogonal CAZAC sequences is generated using a cyclic shift of an initial sequence, $CAZAC_0(L)$. For example, a portion of the initial sequence $CAZAC_0(L)$ is copied from the right-hand side of the sequence shown in FIG. 1 to the left-hand side to form the cyclic prefix (CP) for the initial sequence $CAZAC_0(L)$. The next sequence $CAZAC_Q(L)$ is formed by dropping the right-hand side portion of the initial sequence $CAZAC_0(L)$ and appending the cyclic prefix to the sequence $CAZAC_Q(L)$. The cyclic prefix of the new sequence $CAZAC_Q(L)$ is again formed by copying a portion of the right-hand side of the sequence $CAZAC_Q(L)$ and appending it to the left-hand side of the sequence $CAZAC_Q(L)$. Additional sequences $CAZAC_{2Q-MQ}(L)$ may be formed using the same algorithm. As long as the cyclic shift is longer than the maximum delay spread, the cyclically-shifted sequences are orthogonal.

The RACH receiver detects the random access signals by correlating the received signal with the reference signal $x_u(k)$ to identify possible peaks. Often, time domain correlation is implemented using FFT operations and frequency domain multiplication. Thus, the receiver needs to generate the frequency domain root sequence:

$$X_u(k) = \sum_{k=0}^{N_{CZ}-1} x_u(n) e^{j\pi nk/N_{CZ}}. \quad (2)$$

$$k = 0 \sim N_{cz} - 1,$$

A straightforward generation method requires performing an 839 point discrete Fourier transformed (DFT) to generate the frequency domain root sequence $X_u(k)$. Since 839 is a prime number, this direct generation method is costly and requires complex hardware to implement. One alternative solution is to pre-generate and pre-store these sequences in the memory. However, this solution requires that a large amount of memory be allocated to store the pre-generated sequences.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in a random access channel receiver. One embodiment of the method includes generating at least one frequency domain reference sequence by multiplying a generator function and a first frequency domain root CAZAC sequence. The frequency domain reference sequence(s) is generated in response to receiving a signal at the random access channel receiver. This embodiment of the method also includes correlating the received signal and the frequency domain reference sequence(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
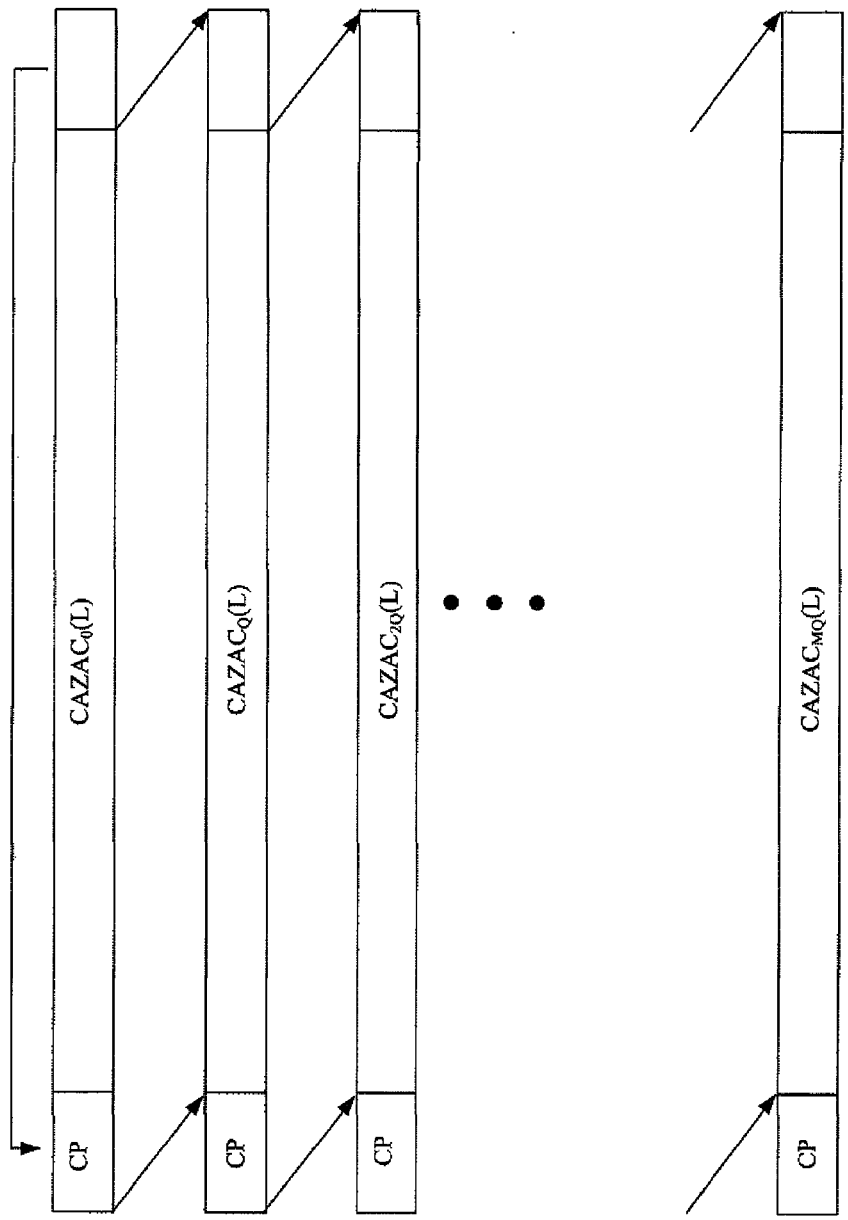
FIG. 1 conceptually illustrates a conventional method of generating orthogonal sequences.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
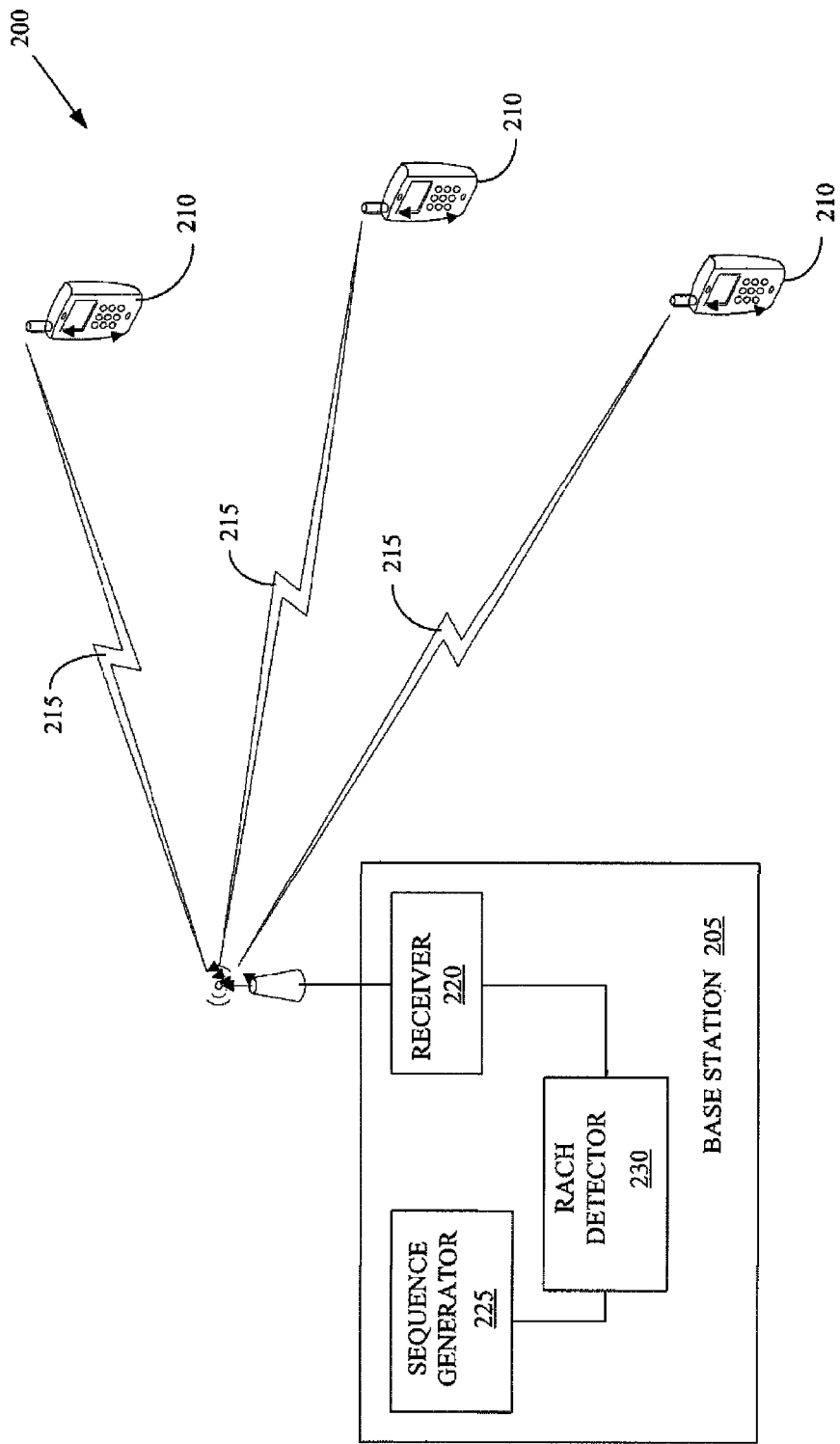
FIG. 2 conceptually illustrates an exemplary embodiment of a wireless communication system.

FIG. 2 conceptually illustrates one exemplary embodiment of a wireless communication system 200. In the illustrated embodiment, the system 200 includes a base station 205 that provides wireless connectivity to one or more mobile units 210 over corresponding air interfaces 215. The air interfaces 215 may support various downlink (or forward link) channels and various uplink (or reverse link) channels that are defined according to various standards and/or protocols. Exemplary uplink channels include traffic channels and signaling channels including one or more random access channels (RACHs) that may be used to transmit messages such as requests to establish a wireless connection between the base station 205 and one of the mobile units 210. Techniques for providing wireless connectivity according to various standards and/or protocols are known in the art and in the interest of clarity only those aspects of providing wireless connectivity that are relevant to the present subject matter will be discussed herein.

A receiver 220 in the base station 205 periodically or substantially continuously monitors the random access channels and searches the signals received on the random access channels for predetermined sequences of symbols (sometimes referred to as the RACH preamble) in random access messages transmitted by the mobile units 210. In the illustrated embodiment, the random access messages are formed according to the Universal Mobile Telecommunication Services (UMTS) Long Term Evolution (LTE) standards and/or protocols and are transmitted in a subframe during a transmission time interval (TTI) of 1 ms in 1.08 MHz bandwidth. The random access messages subframe is divided into a 0.8 ms preamble and a 102.6 μs cyclic prefix that includes a copy of a portion of the sequence of symbols in the preamble. The remaining 97.4 μs in the transmission time interval is reserved as a guard time to reduce or prevent inter-symbol interference between different random access messages or shared data channels. However, persons of ordinary skill in the art having benefit of the present disclosure should appreciate that alternative embodiments of the system 200 may implement other standards and/or protocols that may call for different preamble contents and/or formats.

The base station 205 includes a sequence generator 225 that generates sequences that correspond to the sequences that the mobile units 210 may use to form random access messages. These sequences can be correlated with the received signals to detect random access messages transmitted by the mobile units 210. In the illustrated embodiment, the comparison is performed in the frequency domain and so the sequence generator 225 generates frequency domain reference sequences by multiplying a generator function and a frequency domain root sequence. For example, the initial sequence may be a frequency domain root Constant Amplitude Zero Auto Correlation (CAZAC) sequence such as a Zadoff-Chu sequence. However, other CAZAC sequences may alternatively be used in other embodiments. In one embodiment, the generator may be stored as a lookup table or a group of interconnected lookup tables.

The generated sequence(s) and the received signal may be provided to a RACH detector 230 in the base station 205. The RACH detector 230 may then correlate the sequences with the received signal to attempt to detect RACH messages transmitted by the mobile units 210. For example, the RACH detector may detect a RACH message if the correlation signal produced by correlating one of the sequences with the received signals exceeds a threshold value. Techniques for correlating reference sequences with portions of a received signal are known in the art and in the interest of clarity only those aspects of performing the correlation that are relevant to the present subject matter will be discussed herein. The base station 205 may then establish a wireless communication link with the mobile unit 210 based in part on the information in the received RACH message.

Figure 3:
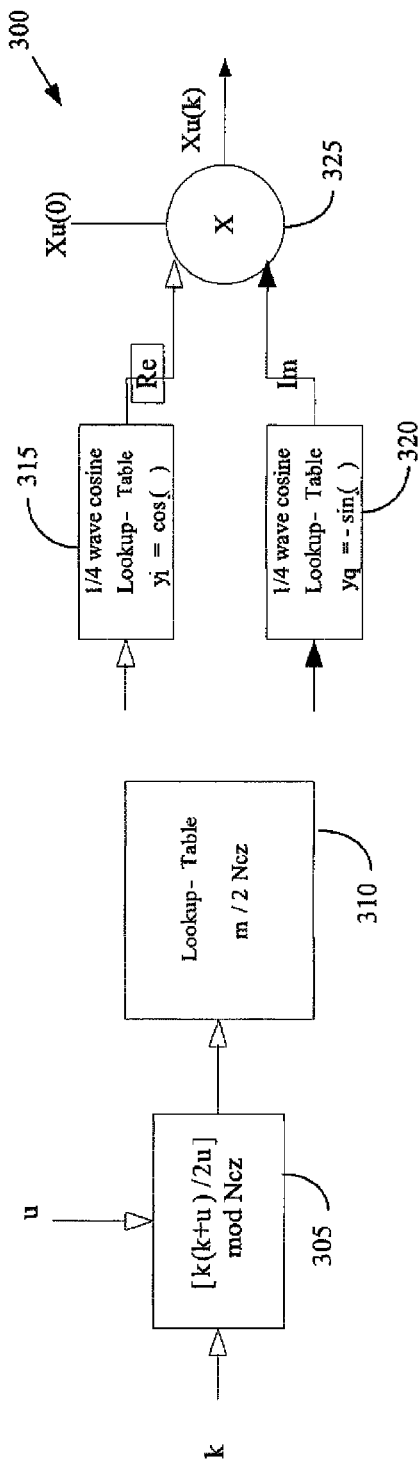
FIG. 3 conceptually illustrates a first exemplary embodiment of a sequence generator.

FIG. 3 conceptually illustrates a first exemplary embodiment of a sequence generator 300. In the illustrated embodiment, a selected number of sequences are available to the mobile units and the base station. For example, if CAZAC sequences are being used, the number of available sequences depends on the configuration and can range from $N_{ZC}=13$ to $N_{ZC}=839$. The sequence generator 300 can generate a separate frequency domain root sequence for each sequence index $0<k<N_{ZC}$. The order of the sequence (u) may also be specified. Although the sequence generator 300 uses the sequence index and order to specify the generator function, persons of ordinary skill in the art should appreciate that other formulations of the generator function may also be used in alternative embodiments.

In the illustrated embodiment, the frequency domain generation method is based on the following equation:

$$X_u(k) = W^{-\frac{k(k+u)}{2u} mod N_{ZC}} X_u(0) \qquad (3)$$

where $W = e^{-j2\pi/N_{ZC}}$ is the generator function. The exponent of the generator function is calculated by a finite field dividing element 305 that calculates the value of $$\frac{k(k+u)}{2u} mod N_{ZC}$$

over the finite field $GF(N_{ZC})$. For example, if the sequence index k=1, and the sequence order u=100, then $$\frac{k(k+u)}{2u} mod N_{ZC} = 592,$$

which clearly differs from the value 0.505 that would be obtained using a conventional division operation. Hardware implementations of the division function over the finite field $GF(N_{ZC})$ are known from the fields of coding and cryptography. These hardware algorithms have been implemented using limited clock cycles and simple arithmetic operations.

The frequency domain root sequences generated by the generator function defined for this embodiment are identical to the sequences obtained by performing a discrete Fourier transform on the corresponding time domain root sequence. This can be demonstrated using the definition of the DFT of the time domain root sequence $x_u(n)$, which is denoted as $X_u(k)$:

$$X_u(k) = \sum_{n=0}^{N_{CZ}-1} x_u(n) W^{nk} \qquad (4)$$

First, look at a single term inside the summation:

$$x_u(n) W^{nk} = W^{u[n(n+1)+2\frac{k}{u}n]/2} = W^{u[n(n+1)+2dn]/2},$$

where $$d = \frac{k}{u} mod N_{CZ}.$$

Note, the operation on the exponential term of W is defined over the finite field $GF(N_{ZC})$.

The above can be further expanded to:

$$\begin{aligned} x_u(n) W^{nk} &= W^{u[n(n+1)+2dn]/2} \frac{W^{ud(d+1)/2}}{W^{ud(d+1)/2}} \\ &= W^{-ud(d+1)/2} W^{u(n+d)(n+d+1)/2} \\ &= W^{-\frac{k(k+u)}{2u}} x_u(k+d). \end{aligned} \qquad (5)$$

Then, equation (5) is substituted back to equation (4), to arrive at:

$$X_u(k) = W^{-\frac{k(k+u)}{2u}} \sum_{n=0}^{N_{CZ}-1} x_u(n+d),$$

for $$d = \frac{k}{u} mod N_{CZ},$$

Note that $$\sum_{n=0}^{N_{CZ}-1} x_u(n+d) = \sum_{n=0}^{N_{CZ}-1} x_u(n) = X_u(0),$$

which is exactly equivalent to equation (3):

$$X_u(k) = W^{-\frac{k(k+u)}{2u}} X_u(0).$$

The values of the exponent of the generator function may then be stored in an exponent lookup table 310. For example, the entries in the exponent lookup table may be indexed by the sequence index and order. The exponents in the lookup table 310 may be used to populate lookup tables 315, 320 that store the real and imaginary parts of the generator function. The lookup tables 310, 315, 320 may be generated and/or populated prior to (or concurrently with) the base station receiving signals from a mobile unit.

Once the base station starts monitoring the RACH channels and/or receiving signals that could be from mobile units, the lookup tables 310, 315, 320 can be used to perform on-the-fly frequency domain CAZAC sequence generation. In the illustrated embodiment, the sequence generator 300 starts generating sequences in response to the base station receiving signals that could contain RACH messages from one or more mobile units. A multiplier circuit 325 accesses the zero-index frequency domain root sequence Xu(0) and then performs a complex multiplication of Xu(0) and the generator function corresponding to the desired sequence index, k. The generator function is retrieved as needed from the lookup tables 310, 315, 320. The frequency domain root sequence Xu(k) can then be provided to a RACH detection element for RACH detection by correlating the frequency domain root sequence with the received signal.

Figure 4:
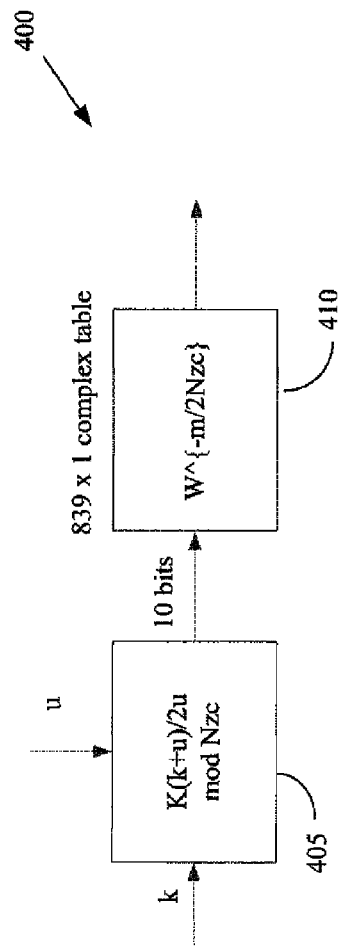
FIG. 4 conceptually illustrates a second exemplary embodiment of a sequence generator.

FIG. 4 conceptually illustrates a second exemplary embodiment of a sequence generator 400. The second exemplary embodiment takes advantage of properties of the frequency domain root sequences to simplify the storage of the generator function. The exponent of the generator function is calculated by a finite field dividing element 405 that calculates the value of $$\frac{k(k+u)}{2u} \bmod N_{ZC}$$

over the finite field $GF(N_{ZC})$, as in the first exemplary embodiment. However, the second exemplary embodiment differs from the first exemplary embodiment because the second embodiment uses the property that for RACH processing the zero-index frequency domain root sequence Xu(0) can be ignored since the detection is non-coherent based. The entire complex generator function W can then be stored as a single complex lookup table 410. In the illustrated embodiment, the complex lookup table 410 is an 839×1 complex table that includes entries that represent the complex generator function.

In other embodiments of the sequence generators, further simplifications can be achieved using other properties of the sequences, such as symmetric properties, when the root sequences are grouped into pairs. These symmetric properties can be taken advantage of by combining the sequence generation function with the subsequent complex multiplication operation. Thus, the on-the-fly sequence generators 225, 300, 400 can eliminate the need to pre-store all the root sequences. Embodiments of the techniques described herein can therefore speed up the calculation of the frequency domain root sequences while also reducing the storage requirements for the associated lookup tables.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a random access channel receiver, the method comprising:
   storing at least one lookup table representative of a generator function at the random access channel receiver;
   generating, in response to receiving a signal at the random access channel receiver, at least one frequency domain reference sequence by multiplying a value of the generator function indicated in said at least one lookup table and a first frequency domain root Zadoff-Chu sequence, wherein generating said at least one frequency domain reference sequence comprises generating at least one second frequency domain root Zadoff-Chu sequence having a selected order corresponding to an order of the first frequency domain root Zadoff-Chu sequence; and
   correlating the received signal and said at least one frequency domain reference sequence to generate a correlation signal for detecting at least one random access message transmitted over an air interface by at least one mobile unit.

2. A method for implementation in a random access channel receiver, the method comprising:
   storing at least one lookup table representative of a generator function at the random access channel receiver;
   generating, in response to receiving a signal at the random access channel receiver, at least one frequency domain reference sequence by multiplying a value of the generator function indicated in said at least one lookup table and a first frequency domain root constant amplitude zero auto-correlation (CAZAC) sequence, wherein the first frequency domain root CAZAC sequence is a Zadoff-Chu sequence and wherein generating said at least one frequency domain reference sequence comprises generating at least one second frequency domain root Zadoff-Chu sequence having a selected order corresponding to an order of the first frequency domain root Zadoff-Chu sequence, and wherein said first frequency domain root Zadoff-Chu sequence has a first sequence index, and wherein generating said at least one second frequency domain root Zadoff-Chu sequence comprises generating said at least one second frequency domain root Zadoff-Chu sequence having a second sequence index larger than the first sequence index; and correlating the received signal and said at least one frequency domain reference sequence.

3. A method for implementation in a random access channel receiver, the method comprising:

forming at least one lookup table representative of a generator function prior to receiving the signal at the random access channel receiver;

generating, in response to receiving a signal at the random access channel receiver, at least one frequency domain reference sequence by multiplying a generator function and a first frequency domain root constant amplitude zero auto-correlation (CAZAC) sequence, wherein the first frequency domain root CAZAC sequence is a Zadoff-Chu sequence and wherein generating said at least one frequency domain reference sequence comprises generating at least one second frequency domain root Zadoff-Chu sequence having a selected order corresponding to an order of the first frequency domain root Zadoff-Chu sequence, and wherein said first frequency domain root Zadoff-Chu sequence has a first sequence index, and wherein generating said at least one second frequency domain root Zadoff-Chu sequence comprises generating said at least one second frequency domain root Zadoff-Chu sequence having a second sequence index larger than the first sequence index; and correlating the received signal and said at least one frequency domain reference sequence.

4. A method for implementation in a random access channel receiver, the method comprising:

generating, in response to receiving a signal at the random access channel receiver, at least one frequency domain reference sequence by multiplying a generator function and a first frequency domain root constant amplitude zero auto-correlation (CAZAC) sequence, wherein the first frequency domain root CAZAC sequence is a Zadoff-Chu sequence that has a first sequence index, and wherein generating said at least one frequency domain reference sequence comprises generating at least one second frequency domain root Zadoff-Chu sequence having a selected order corresponding to an order of the first frequency domain root Zadoff-Chu sequence and having a second sequence index larger than the first sequence index; and forming at least one lookup table representative of the generator function prior to receiving the signal at the random access channel receiver, wherein forming said at least one lookup table comprises forming said at least one look up table based upon the selected order and the second sequence index.

5. The method of claim 4, wherein forming said at least one lookup table comprises forming a ratio using the selected order and the second sequence index, said ratio being defined by a division over a finite field that is defined based upon a selected number of Zadoff-Chu sequences.

6. The method of claim 5, wherein forming said at least one lookup table comprises forming a first look up table representative of a real portion of the generator and a second lookup table representative of an imaginary portion of the generator, the first and second lookup tables being formed using results of the ratio defined over the finite field.

7. The method of claim 6, wherein forming said at least one lookup table comprises forming a complex lookup table representative of the generator, the complex lookup table being formed using the ratio defined over the finite field.

8. The method of claim 7, wherein forming the complex lookup table comprises forming the complex lookup table based on at least one symmetry of the generator.

9. The method of claim 8, wherein generating said at least one second frequency domain root Zadoff-Chu sequence comprises combining the first frequency domain root Zadoff-Chu sequence and either the complex lookup table or the first and second lookup tables.

10. The method of claim 9, comprising detecting at least one random access channel signal including said at least one frequency domain reference sequence by correlating the received signal and said at least one frequency domain reference sequence.

11. The method of claim 1, wherein storing said at least one lookup table comprises storing said at least one lookup table prior to receiving the signal at the random access channel receiver.

12. A method for implementation in a random access channel receiver, the method comprising:

storing at least one lookup table representative of a generator function at the random access channel receiver, wherein storing said at least one lookup table comprises storing values of exponents of the generator function that are indexed by sequence index and order;

generating, in response to receiving a signal at the random access channel receiver, at least one frequency domain reference sequence by multiplying a value of the generator function indicated in said at least one lookup table and a first frequency domain root constant amplitude zero auto-correlation (CAZAC) sequence; and correlating the received signal and said at least one frequency domain reference sequence.

13. The method of claim 12, wherein storing values of the exponents of the generator function comprises determining values of the exponents of the generator function by performing finite field division over a finite field.

14. The method of claim 12, wherein generating said at least one frequency domain reference sequence comprises multiplying a zero-index frequency domain root sequence and a value of the generator function corresponding to a non-zero sequence index.

15. A method for implementation in a random access channel receiver, the method comprising:

storing at least one lookup table representative of a generator function at the random access channel receiver, wherein storing said at least one look up table comprises storing real and imaginary parts of the generator function;

generating, in response to receiving a signal at the random access channel receiver, at least one frequency domain reference sequence by multiplying a value of the generator function indicated in said at least one lookup table and a first frequency domain root constant amplitude zero auto-correlation (CAZAC) sequence; and correlating the received signal and said at least one frequency domain reference sequence.

* * * * *